United States Patent Office 3,339,931
Patented Sept. 5, 1967

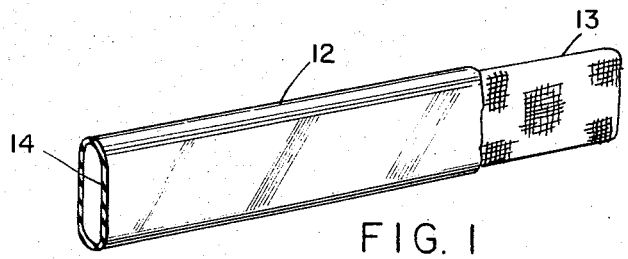
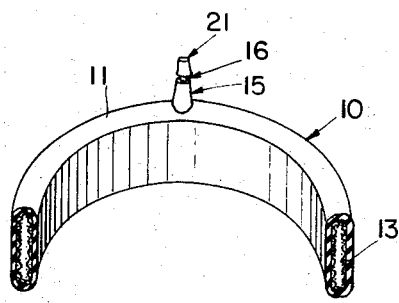
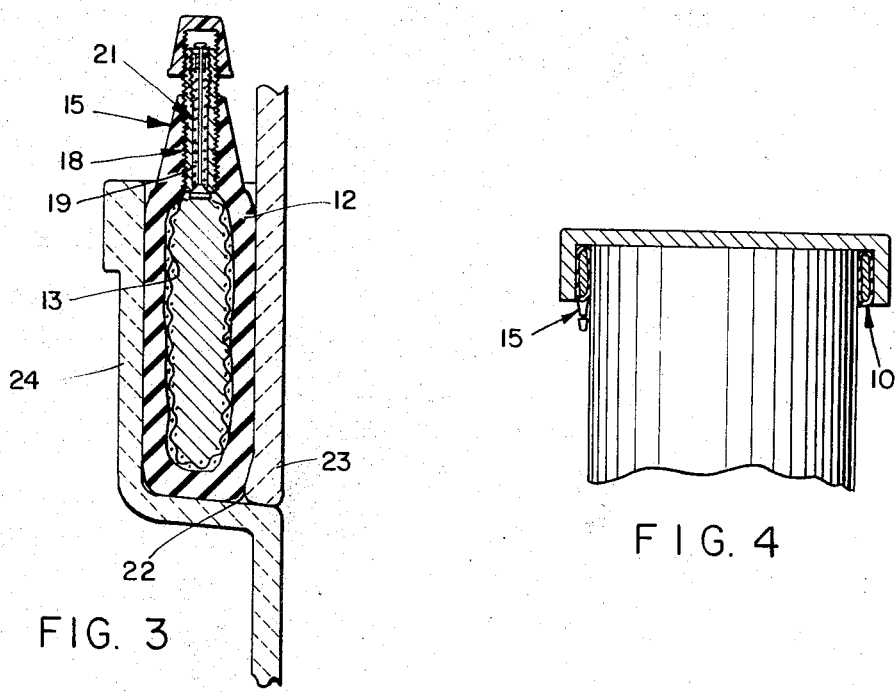

3,339,931
INFLATABLE GASKET WITH WICK
Donald D. Hundt, Arlington, Francis Paul Gavin, Waltham, and John W. Lefforge, Lynnfield, Mass., assignors to W. R. Grace & Co., Cambridge, Mass., a corporation of Connecticut
Filed Dec. 31, 1964, Ser. No. 422,607
2 Claims. (Cl. 277—34.3)

ABSTRACT OF THE DISCLOSURE

The invention comprises a gasket suitable for sealing a joint between pipe sections, especially bell and spigot joints. It is intended that after the gasket has been installed in the joint space, the hollow space within the gasket be "inflated" with a self-hardening resin. To insure the uniform exposure of the injected resin to the activator, a capillary-active wick is placed in the hollow space within the gasket which will hold and uniformly distribute activator injected into the gasket before the charge of resin is pumped in.

---

This invention relates to inflatable gaskets. The utility of the invention in inflatable gaskets of any shape will be obvious as this specification proceeds. One form, a ring gasket suitable for sealing the joint between bell and spigot pipes and representative of a substantial field of use, will be presented as the preferred example.

In the case of bell and spigot gasket seals, our improved inflatable gasket may be used with all pipes made with bell and spigot end configurations, whether they be made of metal, vitrified clay, concrete, or other materials. A particular field of usefulness is in forming gas- and water-tight joints in the cast iron sanitary lines of frame buildings. The ease with which it may be assembled and the fact that the gasket requires no plumber's furnace with its attendant fire hazard, make it an especially useful pipe joint seal. The seal will permit slight pipe movements, and will remain tight even if there be subsequent slight building displacements due to wood shrinkage. Conventionally, the cast iron piping used for sewer lines in such service is built up from five-foot sections of cast bell-and-spigot pipe. The joints are made tight first by "yarning" the joints—an operation which entails packing oakum in the free space between the spigot and the bell, and then pouring molten lead into the space. Conventionally, about one pound of lead per inch diameter of the pipe is used. But pouring lead on top of the oakum and into the joint space does not produce the tight seal. The lead subsequently must be compacted by hammering the lead ring. This is an operation requiring considerable skill. If the blows on the calking iron are too heavy the bell will be split and the pipe be ruined. If they are too light, the joint will not be properly calked. Since both the clearance and the yarning are always variables, the expert judges joint tightness by "feel."

But perhaps the greatest difficulty associated with such a joint procedure is that when the piping is installed in a frame building slight motions of the building frame are not reflected by like motions in the inflexible joints, and leaks develop. Because sanitary plumbing in a house is usually concealed within the partition walls, even small leaks cause substantial damage and much tearing out of plaster and wall structure is usually necessary to repair them.

The present invention provides a pipe joint seal which can be made in a very few minutes. It is permanently tight and resists the leakage of liquids or sewer gas and at the same time possesses a slight degree of flexibility necessary to overcome the ordinary "settling" of a building. The joints will not open, nor will leaks develop.

In an application filed by Hundt and Greenlie, Ser. No. 204,292, filed June 21, 1962, an inflatable gasket was disclosed which, in the embodiment suitable for sealing bell and spigot pipes, comprised a hollow annulus of rubber material. This annulus was slid over the spigot end of one pipe and then the pipe and annulus was fitted into the bell end of the adjoining pipe. Subsequent to fitting the pipes together, the hollow core of the annulus was pumped full, or inflated, with a self hardening resinous compound. The present invention and the above-mentioned Hundt and Greenlie application are assigned to a common assignee. The entire disclosure of application Serial Number 204,292 is herein incorporated by reference.

Self-hardening compositions which are commonly used in connection with the said Hundt and Greenlie seal are usually polyesters or epoxy resins. Both of these must be activated with definite amounts of so-called "hardeners" which must be mixed with the resin just prior to its use, for the pot life of the activated resin mixture is quite short. When the hardener and the resin are properly and carefully mixed prior to loading the inflatable gasket with the resinous composition, excellent seals are produced. Unfortunately, plumbers in the field are not always careful, and improper mixtures and careless handling have produced seals which are defective.

The present invention is an improvement on the Hundt and Greenlie device. It includes means which make mixing of the hardener with the resin unnecessary, but nevertheless exposes each increment of resin injected into the gasket to contact with a uniform distribution of the hardener. In consequence, the whole mass of resin cures uniformly and no soft or uncured areas exist to cause sealing defects. The field operations are simple. There is little likelihood that they will be misunderstood.

The means which we employ to secure the uniform distribution of the hardener in the resinous mass comprises a capillary mass which is placed inside of the hollow gasket. The mass should possess a surface area which is practically coextensive with at least one wall dimension of the interior space. The mass forms a wick which receives the liquid hardener and distributes it uniformly across the area. Since the hardener spreads by capillarity throughout the capillary active mass, the resin which is later injected into the hollow space is progressively brought into contact with the hardener as the space fills with resin. The hardening reaction proceeds with the result that a ring of solid, uniformly hardened resin is formed inside of the gasket. This contrasts with experience when self-hardening mixtures have been carelessly prepared. Then, areas of the resin were not exposed to the hardener, and remained liquid.

As the capillary active mass or wick, felted masses which may be either air- or water-laid, of, e.g., cellulose, hair, asbestos, or glass, are suitable, and possess special advantage when the gasket has a flat form. For the pipe joint gasket, however, we find it more convenient to form the wick from a length of tubular woven or knitted material, specifically stockinette. The invention may best be understood from the drawing in which FIG. 1 is a perspective view showing the gum stock extrusion with a portion broken away to show the wick, FIG. 2 is a cross-sectional elevation of the completed seal prior to assembly, FIG. 3 is a partial cross-section showing the completed seal in a bell and spigot joint and after the seal has been inflated with resin, and FIG. 4 is a cross-section of the wall and end structure showing the gasket in position when end closures are formed—typically a well seal.

The seal 10, used with bell and spigot pipes, comprises a hollow annular sheath 11 formed of rubber material. Its cross-section is usually in the form of a flattened ellipse. Some modification of this general shape is usually required because of the particular configuration of the bell and spigot, e.g. the top margin of the annulus may have a longer radius than has the bottom margin, so that one wall of the seal lies at a small angle. The rubbers which are suitable for forming the seal preferably are of highly resistant types such as chlorobutadiene rubbers, acrylonitrile styrene rubbers, ethylene polysulfide rubbers, and like resistant materials.

The following method of manufacture is given by way of illustration and not by limitation, since various methods of manufacture will immediately be obvious to the experienced rubber molder. For example, a flat sheet of gum stock could be folded about the wick. As an example of one method of manufacture, the seal may be made by extruding a tube of uncured stock 12, having the proper exterior configuration as shown in FIG. 1. Lengths of the gum stock appropriate for the pipe diameters which are to be sealed, are cut from the extruded tube, and the wick 13 is inserted in the bore 14. Wick 13 may be either a tube or a flat sheet of a fibrous felt such as cellulose, asbestos or glass, but conveniently is a length of tubular knit stockinette. Its length is slightly shorter (one-eighth to one-fourth of an inch less than that of the rubber tube). The shorter wick prevents buckling in assembly and any interference with the fusion of the ends of the gum tube 12, which is shortly to be formed into a ring. Wick 13 may be lightly brushed with rubber cement on its exterior surface and so caused to adhere to the inner walls of the gum stock. It is pushed into place with an oversized bodkin.

The straight length of this assembly then has its ends butted together about a jig where the filling boss 15 is applied, and the filling orifice 16 is inserted. Boss 15 may be formed simply by sticking a small block of gum rubber onto the top surface of the annular sheath 11. Alternatively, a finned extrusion can be made and the fin subsequently cut away except in the area where the boss is to be formed.

The filling orifice is formed by pushing a hollow threaded rivet, 18, through the gum stock of the boss, through the upper wall of the tube 12 and through an opening in the stockinette 13 which is preferable although not necessary. This provides a passage 19, which permits the space within the stockinette tube to communicate more readily with the exterior. The gum assembly is then placed in a mold and an air connection is established through the threaded rivet 18 to provide a pressure within the annulus which forces the gum stock into contact with the walls of the mold. The rubber is cured in the mold at pressures and at temperatures which are appropriate for the rubber compound being used, while suitable air pressure is maintained within the annulus.

When vulcanization within the mold is complete, the air pressure is released, the seal is allowed to cool, the air supply is disconnected from the rivet 18, and the passages are closed by check valve 21. In this condition, the seal becomes an article of commerce, sold to the plumbing trade.

When the plumber is about to use the seal, he injects into the gasket a measured quantity of activator. This material may be supplied in a collapsible tube, the contents of which are discharged into the seal by an appropriate spout connection. Thereafter, the seal is forced over the usual bead 22 on the spigot end of a pipe 23, and the bell 24 of an adjoining pipe is pushed on over the assembly. The filling boss 15 is directed upwardly along the pipe 23, so that the check valve will be accessible. Loading the seal with activator prior to assembling the ring over the end of the pipe is not necessary if the resin injection does not follow immediately. It does speed the distribution of the activator through the capillary active mass 13 simply by the handling which this involves. The direction to load the gasket with activator prior to assembling it on the pipe makes certain that the activator will completely permeate the wick before the resin can reach it.

If, for example, joints are being made in a four-inch pipe, the plumber then connects one of the passages 19, which includes a check valve 21 to a pressure gun of a type similar to the lever type grease gun which are commonly used, and if any epoxy resin is used, he then will pump in approximately 70–72 grams of an epoxy resin at mild pressures, usually in the order of about 70 pounds. When this pressure is reached, the annulus is completely filled with resin and the gun is disconnected. In approximately 24 hours after the gasket has been loaded with resin, what previously had been the bore of the hollow annulus will be filled with a solid, hardened epoxy resin.

Since the sheath 11 is rubber and has been forced into firm contact with the interior wall of the bell 24, and the exterior wall of the pipe 23 by the pressure applied to the liquid resin, a tight pipe-joint is formed. The rubber can withstand and will conform to certain amounts of distortion. Hence, minor movements of the building will not cause the seal to loosen or to give way.

For clarity and illustration, the area occupied by the hollow wick and the area occupied by the hardened resin have been shown as separate parts. It is to be understood, however, that in actuality the resin penetrates the wick, fills all of its interstices, and comes into direct contact with the interior walls of the sheath 11.

*Example I*

An inflatable seal, formed of acrylonitrile rubber, was provided with a tubular wick of cotton fabric, rib-knit with single, No. 12 thread on a 120-needle machine, approximately 18 ribs to the inch. The flat diameter of the fabric tube was 1½ inches. Before assembly, the usually exposed face of the flattened wick was lightly brushed with a solvent cement, and the wick was then pushed into the gum tube. The ends of the gum tube were butt-jointed, the filling boss was applied in the manner previously described, and the assembly placed in a mold. As the mold was being closed, air pressure was admitted through the passage 19 to a balancing pressure. The seal between pipes was formed in the following manner: a total of eight grams of diethylene triamine was injected into the bore through the passageway 19. The gasket was then fitted over the spigot end of a four-inch cast-iron soil pipe, and the assembly was pushed into the bell of an adjoining four-inch soil pipe. Fifty-two grams of Shell No. 815 epoxy resin was then pumped into the bore by connecting the threaded passage 19 to a small hand pump. Pumping was continued until the pressure reached 72 pounds. The pump was then disconnected and the assembly was stored for 24 hours. At the end of this period, the joint was broken open, the rubber sheath was slit, and the solid ring of hardened epoxy resin was examined. No unhardened areas or hollow spaces were found. At the time of examination, the resin had a Shore D hardness of 85–90.

*Example II*

Seals were made in the same manner as described in Example I. Two grams of methylene-ketone-peroxide (Lupersol DDM—Lucidol Division, Wallace and Tiernan Company, Inc.) was forced into the gasket through the passageway 19. Subsequently, an unsaturated polyester, dissolved in about 30 percent styrene (Plaskon 9545, Allied Chemical Company), was pumped into the gasket to a pressure of 80 pounds. After 24 hours, the gasket was examined as is described in Example 1. The polyester had cured to a hardness of Shore D 90. There were no voids and all areas were uniformly cured. The weight of the polyester was 48 grams.

In general, we have found that wicks, the solid volume of which occupies approximately 8–10 percent of the included volume of the bore, satisfactorily distribute the activator, but a larger bulk of wick may be used. Generally also we have found that if the weight of the activator pumped into the bore is approximately 150 percent of the recognized amount necessary to secure the desired cure of the resin (in epoxy systems), a uniform cure will be assured. The necessary amount, however, depends upon the particular resin formulation.

As a counter-example to Example I, eight grams of diethylenetriamine were placed in an evacuated seal which contained no wick. The bore was then filled with Shell epoxy resin, No. 815, to a pressure of 72 pounds. At the end of 24 hours, the seal was examined as described in connection with Example I. Less than 10 percent of the resin had gelled, and it had not hardened.

As a counter-example to Example II, two grams of methylene-ketone-peroxide were placed in a previously evacuated seal. The same polyester (Plaskon 9545) was pumped into the gasket to a pressure of 80 pounds. After a period of 24 hours at room temperature, gelling was found to be incomplete.

The specific resins and hardening activators named in the examples are but illustrative of a very wide range of room temperature hardening resinous compositions which are suitable. Large numbers of resin-activator combinations, epoxy and polyester types, as well as proprietary mixtures of such compositions containing filling and reinforcing agents, are available from numerous commercial sources. Provided the viscosity of the resin or of the resin-filler mixture lies in the suitable range, usually below 10,000 centipoises, and provided the viscosity of the activator is equally low, and provided also that the hardening reaction will progress to completion at room temperature, preferably in about 24 hours or less, any of the commercial resin activator combinations can be used with success as the filling and inflating material of our improved joint seal.

Although we prefer a wick formed in tubular shape of knitted material because it has proved to be easy to assemble, knit or woven textiles are not essential. The wick can be a flat strip of either water-laid or air-laid fabrics which have a sufficient degree of capillary activity, i.e., water-laid felts of the "saturating" paper type are equally useful as in the case of stockinette, depending somewhat upon the characteristics of such a wick, we have found that a solid volume of wick substance which occupies from 8–10 percent of the volume of the bore space is sufficient to hold the requisite amount of activator and distribute it uniformly about the bore. As has been mentioned in the case of epoxy resins, a quantity of activator which equals approximately 10–14 percent of the volume of the bore will be found adequate. In the case of polyester resin fillings, the proportion of activator which is requisite is somewhat lower, but a sufficient amount of liquid should be injected to saturate the wick throughout its whole extent.

The effectiveness of the seal in a bell and spigot pipe joint is tested in accord with the normal procedure adopted by plumbers in determining the water and gas tightness of lead joints, i.e., the open ends of the pipe are sealed with the usual expansible plumber's test plugs and air is pumped into the interior of the pipes by the conventional plumber's test pump which is provided with a pressure gage giving accurate readings at low pressures. Approximately five pounds of air is pumped into the enclosed space and pressure is maintained for a minimum of 30 minutes. Tests of seals made as disclosed, when installed in a pipe will show no leakage during the 30-minute test period—leakage being evidenced by a drop in pressure.

Although a ring pipe seal has been shown, it follows that the particular shape of the gasket is unimportant, for example, they may be made in the form of coupling liners or flat gaskets. The gaskets may have any shape which a sealed joint between members requires, the important element is a wick coextensive with at least one major wall area of the hollow, inflatable space within the gasket and capable of holding in a uniform distribution, the supply of activator necessary to complete a resin hardening reaction.

Materials such as the amines and peroxides which are used to cause the hardening of the resinous materials used to inflate the bore of the seal are various known commercially as promoters, hardeners, and activators. The word "activator" has been used in the specification and claims, and will be understood to include substances capable of initiating and containing a hardening reaction in a liquid resin independently of the chemical nature of the reaction which ensues.

We claim:
1. An inflatable gasket adapted to seal the joint between a pair of mating members comprising a hollow sheath formed of a resistant, flexible and distortable rubber material, a wick formed of capillary-active substance enclosed within the sheath, the said wick being coextensive with at least one major interior wall area of said sheath, the wick occupying at least 8% of the hollow interior of said sheath, the capillary capacity of the said wick holding and maintaining in uniform distribution a quantity of a resin activator sufficient to cause the hardening of that quantity of a liquid resin necessary to inflate the gasket to joint-sealing dimensions, and a sealable passage connecting the interior of said sheath with the exposed exterior of the gasket.

2. A gasket adapted to seal the joint between a pair of telescopically engageable pipe sections having a bell and spigot end portions, which comprises an annular sheath formed of a resistant, flexible and distortable sub- ber material, the said sheath having a substantially continuous annular bore, the exterior shape and dimensions of this sheath being such that the outer wall of said sheath will conform to the inner dimensions of the bell and the inner wall of said sheath will conform to the outer dimensions of the spigot, a wick comprising a capillary active substance disposed within the bore and co-extensive with at least one major interior wall area, said wick occupying at least 8% of the annular bore of said gasket and a sealable passage connecting said bore with the exposed exterior, the said wick absorbing and holding in uniform distribution a sufficient quantity of a resin activator to cause the hardening of a liquid resin subsequently injected into the bore in sufficient amount to seal the joint between the said pipe sections.

References Cited

UNITED STATES PATENTS 2,815,966  12/1957  House _____ 277—34.3
3,222,076  12/1965  Hollingsworth _____ 277—34.3

FOREIGN PATENTS 494,402  10/1938  Great Britain.

SAMUEL ROTHBERG, *Primary Examiner.*